United States Patent
Mei et al.

(10) Patent No.: US 11,295,213 B2
(45) Date of Patent: Apr. 5, 2022

(54) CONVERSATIONAL SYSTEM MANAGEMENT

(71) Applicant: International Business Machines Corporation, Armonk, NY (US)

(72) Inventors: Li Jun Mei, Beijing (CN); Qi Cheng Li, Beijing (CN); Xin Zhou, Beijing (CN); Ya Bin Dang, Beijing (CN); Shao Chun Li, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 52 days.

(21) Appl. No.: 16/242,516

(22) Filed: Jan. 8, 2019

(65) Prior Publication Data

US 2020/0218989 A1 Jul. 9, 2020

(51) Int. Cl.
*G06N 5/02* (2006.01)
*G06N 20/00* (2019.01)
*G10L 15/22* (2006.01)

(52) U.S. Cl.
CPC .............. *G06N 5/02* (2013.01); *G06N 20/00* (2019.01); *G10L 15/22* (2013.01); *G10L 2015/225* (2013.01)

(58) Field of Classification Search
CPC ........ H04L 51/02; H04L 51/046; G10L 15/22
See application file for complete search history.

(56) References Cited

U.S. PATENT DOCUMENTS

| 5,857,212 | A * | 1/1999 | Van De Vanter | G06F 8/33 715/234 |
| 7,039,644 | B2 * | 5/2006 | Hind | G06F 11/3636 |
| 9,348,815 | B1 * | 5/2016 | Estes | G06F 40/169 |
| 9,424,861 | B2 * | 8/2016 | Jerram | G10L 25/48 |
| 9,836,461 | B1 * | 12/2017 | Mishne | G06F 16/313 |
| 10,599,656 | B1 * | 3/2020 | Sharma | G06F 16/2457 |
| 10,891,348 | B1 * | 1/2021 | Cohen | G06F 3/04842 |

(Continued)

OTHER PUBLICATIONS

Sutton et al., "Reinforcement Learning: An Introduction," MIT Press, 1998, Cambridge, MA, 551 pages.

(Continued)

*Primary Examiner* — Anne L Thomas-Homescu
(74) *Attorney, Agent, or Firm* — Amin, Turocy & Watson, LLP

(57) ABSTRACT

Embodiments of the present invention relate to computer-implemented methods, systems, and computer program products for managing a conversational system. In one embodiment, a computer-implemented method comprises: obtaining, by a device operatively coupled to one or more processors, a first message sequence comprising messages involved in a conversation between a user and a conversation server; obtaining, by the device, a conversation graph indicating an association relationship between messages involved in a conversation; and in response to determining that the first message sequence is not matched in the conversation graph, updating, by the device, the conversation graph with a second message sequence, the second message sequence being generated based on a knowledge library including expert knowledge that is associated with a topic of the conversation.

20 Claims, 6 Drawing Sheets

(56) References Cited

U.S. PATENT DOCUMENTS

| | | | |
|---|---|---|---|
| 2002/0087949 A1* | 7/2002 | Golender | G06F 11/323 717/124 |
| 2003/0139932 A1* | 7/2003 | Shao | G06F 9/451 704/275 |
| 2007/0036334 A1* | 2/2007 | Culbertson | H04M 3/4938 379/266.01 |
| 2010/0318846 A1 | 12/2010 | Sailer et al. | |
| 2012/0173243 A1* | 7/2012 | Anand | G06F 40/40 704/270.1 |
| 2013/0326427 A1* | 12/2013 | Elias | G06F 9/451 715/854 |
| 2015/0293994 A1* | 10/2015 | Kelly | H04L 41/12 707/740 |
| 2016/0163311 A1* | 6/2016 | Crook | G10L 15/1815 704/275 |
| 2016/0352658 A1* | 12/2016 | Capper | G06N 20/00 |
| 2016/0359686 A1* | 12/2016 | Parandehgheibi | H04L 43/04 |
| 2017/0041388 A1* | 2/2017 | Tal | G06F 40/279 |
| 2017/0060839 A1* | 3/2017 | Kawamura | G06F 40/30 |
| 2017/0091332 A1* | 3/2017 | Haiby-Weiss | G06Q 50/01 |
| 2017/0148055 A1* | 5/2017 | Boothroyd | H04L 51/046 |
| 2017/0148196 A1* | 5/2017 | Muraoka | G06N 5/04 |
| 2017/0149718 A1* | 5/2017 | Balasubramanian | H04L 51/28 |
| 2017/0180284 A1* | 6/2017 | Smullen | H04L 51/046 |
| 2017/0230312 A1* | 8/2017 | Barrett | H04L 51/02 |
| 2017/0243382 A1* | 8/2017 | Banerjee | G06T 11/206 |
| 2017/0286690 A1* | 10/2017 | Chari | G06F 21/577 |
| 2018/0107342 A1* | 4/2018 | Deets, Jr. | H04L 51/04 |
| 2018/0131645 A1* | 5/2018 | Magliozzi | G06F 40/30 |
| 2018/0181608 A1* | 6/2018 | Wu | G06F 16/2423 |
| 2018/0189267 A1* | 7/2018 | Takiel | G06F 16/3329 |
| 2018/0239767 A1* | 8/2018 | Bostick | G06F 16/4393 |
| 2019/0034780 A1* | 1/2019 | Marin | G06F 16/951 |
| 2019/0042988 A1* | 2/2019 | Brown | G06F 16/9535 |
| 2019/0057157 A1* | 2/2019 | Mandal | G06F 16/9535 |
| 2019/0138653 A1* | 5/2019 | Roller | G06F 40/194 |
| 2019/0140995 A1* | 5/2019 | Roller | G06F 40/295 |
| 2019/0182382 A1* | 6/2019 | Mazza | G06F 16/3329 |
| 2019/0213284 A1* | 7/2019 | Anand | G06F 9/453 |
| 2019/0222540 A1* | 7/2019 | Relangi | G06Q 30/01 |
| 2019/0228107 A1* | 7/2019 | Trim | H04L 51/02 |
| 2019/0236205 A1* | 8/2019 | Jia | G06F 16/90332 |
| 2019/0243917 A1* | 8/2019 | Ashoori | G06F 16/3344 |
| 2019/0251966 A1* | 8/2019 | Dharne | G06F 3/017 |
| 2019/0304157 A1* | 10/2019 | Amer | G06N 3/0445 |
| 2019/0317928 A1* | 10/2019 | Hirata | H04L 51/16 |
| 2019/0319898 A1* | 10/2019 | Scanlon | H04L 51/02 |
| 2019/0341039 A1* | 11/2019 | Bharadwaj | G06F 40/216 |
| 2019/0349320 A1* | 11/2019 | Karuppusamy | G06F 16/3329 |
| 2019/0392396 A1* | 12/2019 | Liu | G06F 16/9024 |
| 2020/0073932 A1* | 3/2020 | Jia | G06F 16/288 |
| 2020/0105255 A1* | 4/2020 | Huang | G06F 16/3329 |
| 2020/0110882 A1* | 4/2020 | Ripolles Mateu | G06F 16/3347 |
| 2020/0112475 A1* | 4/2020 | Garapati | G06F 40/284 |
| 2020/0258509 A1* | 8/2020 | Bharadwaj | H04L 51/02 |

OTHER PUBLICATIONS

Young et al., "POMDP-based Statistical Spoken Dialog Systems: a Review," 2013, pp. 1160-1179, IEEE, 18 pages.

Ginzburg et al., "Computational Models of Dialogue," 2009, 64 pages.

Hijjawi et al., "User's Utterance Classification Using Machine Learning for Arabic Conversational Agents," 5th International Conference on Computer Science and Information Technology, 2013, IEEE, 10 pages.

Mell et al., "The NIST Definition of Cloud Computing," National Institute of Standards and Technology, Sep. 2011, Special Publication 800-145, U.S Department of Commerce, 7 pages.

* cited by examiner

CONVERSATIONAL SYSTEM MANAGEMENT

BACKGROUND

One or more embodiments generally relates to machine learning and, more specifically, to management of a conversational system based on machine learning.

SUMMARY

A computer-implemented method, comprises: obtaining, by a device operatively coupled to one or more processors, a first message sequence comprising messages involved in a conversation between a user and a conversation server; obtaining, by the device, a conversation graph indicating an association relationship between messages involved in a conversation; and in response to determining that the first message sequence is not matched in the conversation graph, updating, by the device, the conversation graph with a second message sequence, the second message sequence being generated based on a knowledge library including expert knowledge that is associated with a topic of the conversation.

A system comprises: a memory that stores computer executable components; and a processor, operably coupled to the memory, and that executes the computer executable components stored in the memory, wherein the computer executable components comprise: at least one computer-executable component that: obtains a first message sequence comprising messages involved in a conversation between a user and a conversation server; obtains a conversation graph indicating an association relationship between messages involved in a conversation; and in response to a determination that the first message sequence is not matched in the conversation graph, updates the conversation graph with a second message sequence, the second message sequence being generated based on a knowledge library including expert knowledge that is associated with a topic of the conversation.

A computer program product facilitating a conversational system based on machine learning, the computer program product comprising a computer readable storage medium having program instructions embodied therewith, the program instructions executable by a processor to cause the processor to: obtain a first message sequence comprising messages involved in a conversation between a user and a conversation server; obtain a conversation graph indicating an association relationship between messages involved in a conversation; and in response to determining that the first message sequence not being matched in the conversation graph, updates the conversation graph with a second message sequence, the second message sequence being generated based on a knowledge library including expert knowledge that is associated with a topic of the conversation.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments, in the accompanying drawings, the above and other objects, features and advantages of the present embodiment will become more apparent, wherein the same reference generally refers to the same components in the embodiments of the present embodiment.

Throughout the drawings, same or similar reference numerals represent the same or similar elements.

DETAILED DESCRIPTION

Figure 1:
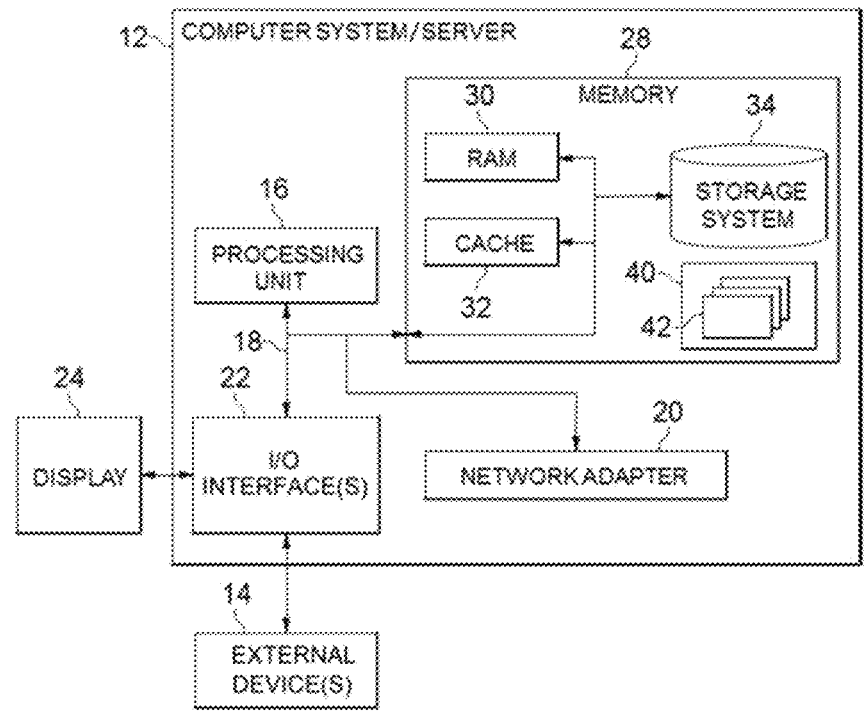
FIG. 1 depicts a cloud computing node according to an embodiment of the present invention.

Some embodiments will be described in more detail with reference to the accompanying drawings, in which the embodiments of the present embodiment have been illustrated. However, the present embodiment can be implemented in various manners, and thus should not be construed to be limited to the embodiments disclosed herein.

It is understood in advance that although this embodiment includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With the development of machine learning technology, machine learning solutions have been widely applied to conversational systems such as chat robot systems. For example, a chat robot system may be deployed in a service center for answering simple questions from users. Usually, a chat robot may follow a predefined conversation graph during a real time conversation with a user. However, as the scope of the conversation graph is limited to some predefined questions and answers, when the question from the user is not included in the conversation graph, the chat robot cannot provide a desired answer.

Referring now to FIG. 1, a schematic of an example of a cloud computing node is shown. Cloud computing node is only one example of a suitable cloud computing node and is not intended to suggest any limitation as to the scope of use or functionality of embodiments of the invention described herein. Regardless, cloud computing node is capable of being implemented and/or performing any of the functionality set forth hereinabove.

In cloud computing node there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
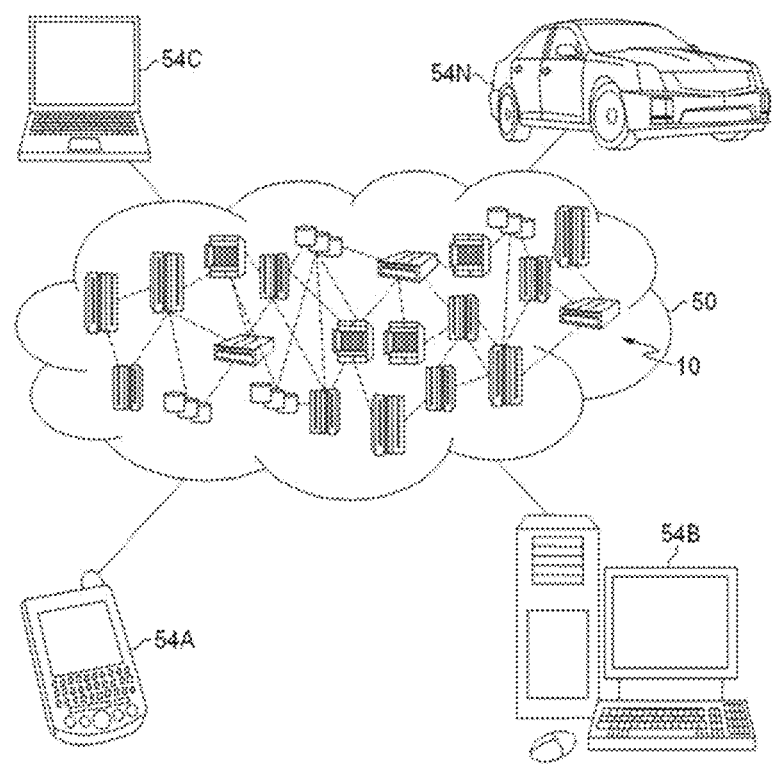
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
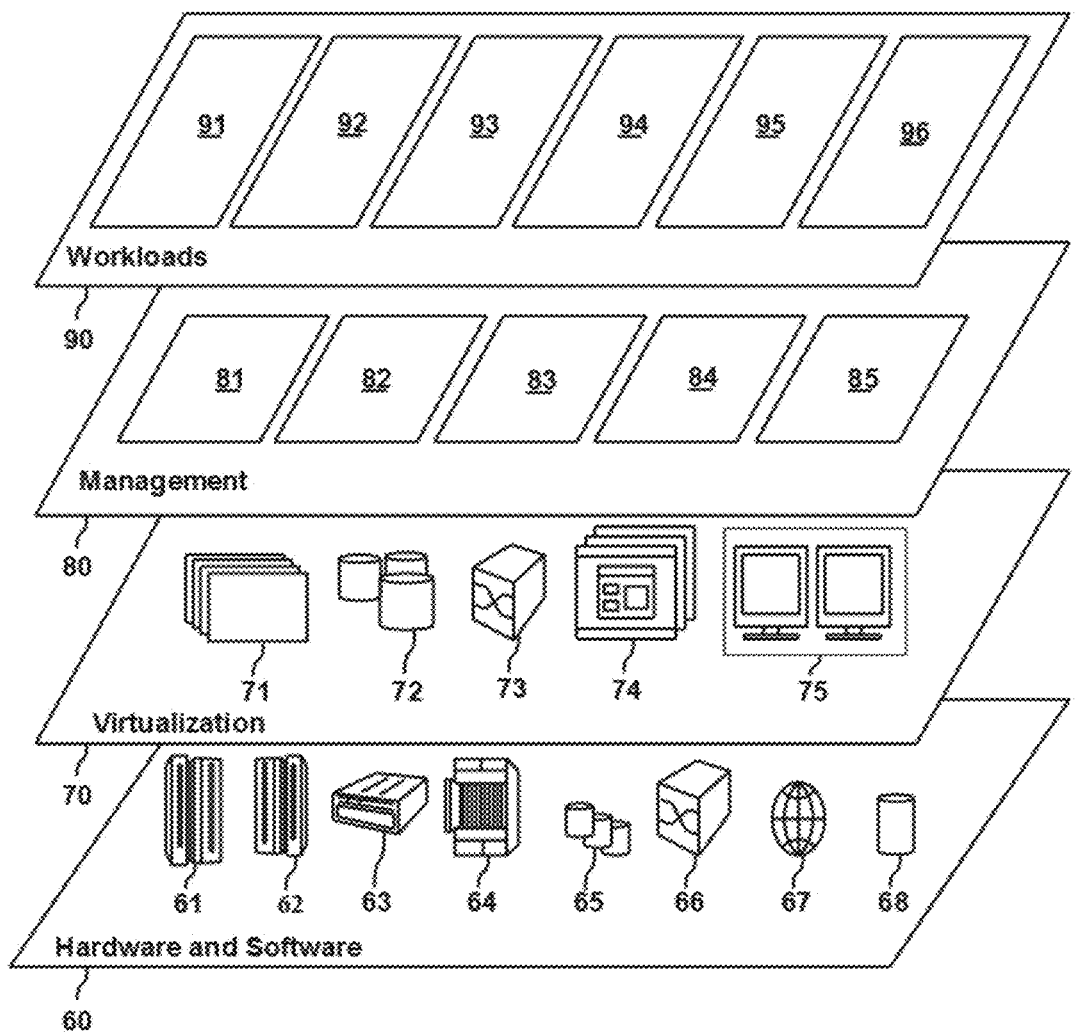
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and conversation management 96.

It should be noted that the processing for managing a conversational system according to embodiments of this disclosure could be implemented by computer system/server 12 of FIG. 1. Hereinafter, reference will be made to FIG. 4 to FIG. 10 to describe details of the conversation management 96.

Figure 4:
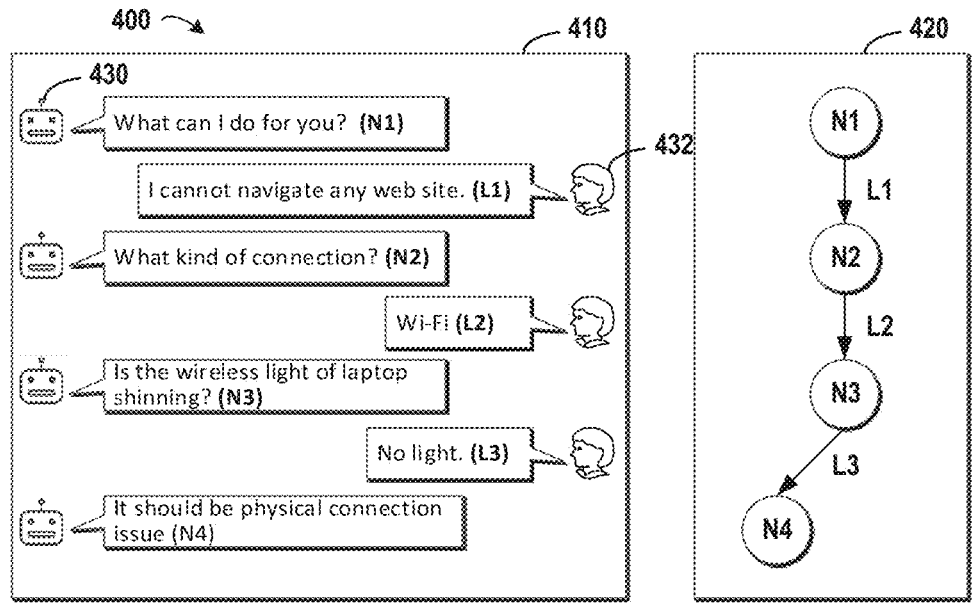
FIG. 4 depicts an example diagram for managing a conversation between a service center and a user.

For the sake of description, embodiments of the present invention will be described in an environment of a trouble shooting service center for a computer manufacture, where users of computers made by the manufacture can communicate with the service center via voice calls or network messages and report failures in their computers. Usually, conversation robots can be used in the service center for answering some simple questions. FIG. 4 depicts an example diagram 400 for managing a conversation 400 between a service center and a user. As depicted in FIG. 4, the conversation 410 happens between a conversation server 430 which can be a chat robot and a user 432. Although the conversation 410 is illustrated in a chat via texts, it can be a telephone conversation. In the case of telephone conversation, voice data can be first converted into text data and then processed according to embodiments of the present invention.

The right side of FIG. 4 shows a conversation graph 420 based on which the conversation server 430 can provide automatic reply such as the messages N1 to N4 upon receiving the user's messages L1 to L3. In FIG. 4, the left side shows the conversation 410 between the conversation server 430 and the user 432. Initially, the conversation server 430 starts the conversation 410 by "What can I do for you (N1)?" here the message is abbreviated as "N1." Then, the user 432 can say "I cannot navigate any web site (L1)." The conversation server 430 can ask "What kind of connection (N2)?" The user can reply "Wi-Fi (L2)," and then the conversation server 430 can ask "Is the wireless light of laptop shinning (N3)?" Based on "No light (L3)" replied by the user 432, the conversation server 430 can determine "It should be physical connection issue (N4)."

In FIG. 4, the conversation graph 420 is predefined and can only deal with the situation as shown in the conversation 410. If the user 432 sends different messages, the conversation server 430 cannot find an appropriate answer from the conversation graph 420. At this point, an error will occur in the conversation server 430. In order to at least partially solve the above and other potential problems, a new method for managing a conversation between the user 432 and the conversation server 430 is disclosed according to embodiments of the present invention.

Figure 5:
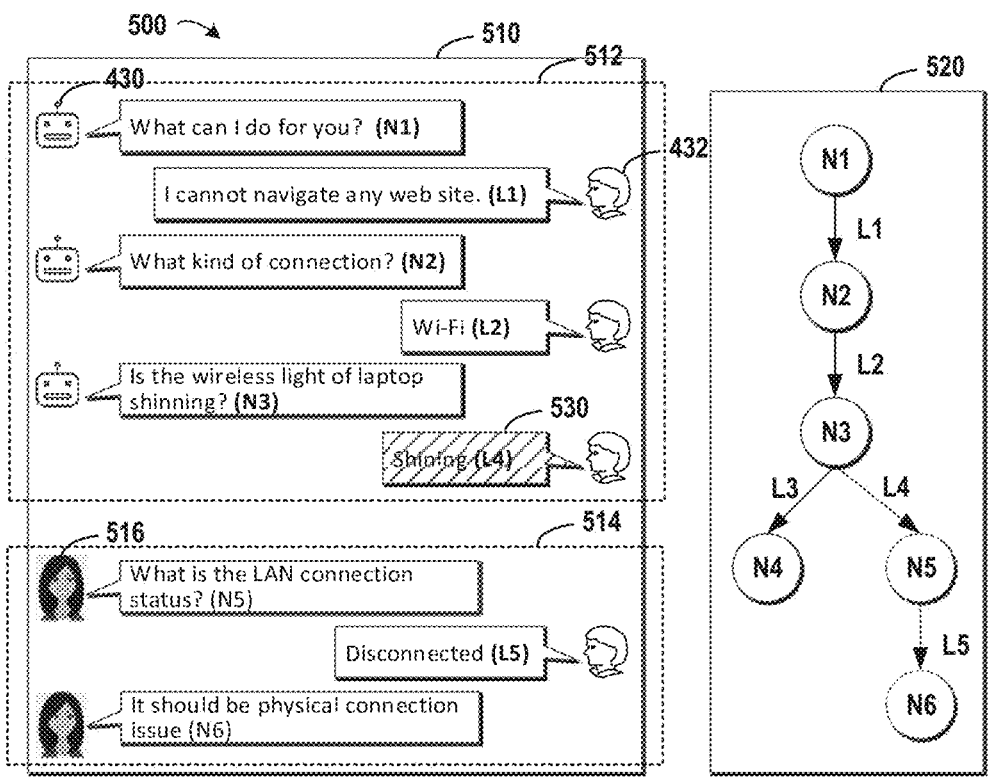
FIG. 5 depicts an example diagram for managing a conversation between a service center and a user according to an embodiment of the present invention.

Hereinafter, reference will be made to FIG. 5 for a general description of embodiments of the present invention. FIG. 5 depicts an example diagram 500 for managing a conversation 510 between the service center 430 and the user 432 according to an embodiment of the present invention. According to embodiments of the present invention, the conversation server 430 can start the conversation 510, where the conversation 510 first happens between the conversation server 430 (e.g. via a chat bot) and the user 432, then a knowledge library 516 takes over the conversation 510 to deal with situations that are not covered by a conversation graph 520. The knowledge library 516 can be a knowledge database or a human expert.

As shown in FIG. 5, a first message sequence 512 can be obtained, here the first message sequence 512 can comprise messages involved in the conversation 510 between the user 432 and the conversation server 430. Further, a conversation graph 520 indicating an association relationship between messages can be obtained. A portion shown in solid shapes in the conversation graph 520 represents the portion which originally exists in the conversation graph 520, and a portion shown in dash shapes (such as nodes N5, N6 and edges L4 and L5) represents the portion which can be updated into the graph 520 by implementing embodiments of the present invention. In this embodiment, the dash portion can be generated based on the knowledge library 516.

As shown in a shaded block 530, the user 432 replies "Shining (L4)" as a response to the conversation server's question N3. As "L4" is not defined in the original portion, it can be determined that the first message sequence 512 is not matched, thus the conversation graph 520 can be updated by a second message sequence 514 that is received based on a knowledge library 516. In these embodiments, the knowledge library 516 can have expert knowledge associated with a topic of the conversation 510. Aided by the knowledge library 516, a cause of the failure in the user's computer can be found and the conversation graph 520 can be updated by the portion shown in dash shapes. Specifically, the knowledge library 516 can replace the conversation server 430 and take over the conversation 510.

In embodiments of the present invention, the knowledge library 516 can be an external knowledge source including knowledge that is not included in the original conversation graph. For example, the knowledge library 516 can be a knowledge database for storing various types of failures and their causes. For another example, the knowledge library 516 can be a human expert.

The knowledge library 516 can communicate with the user 432 and asks "What is the LAN connection status (N5)?" Based on the user's answer "Disconnected (L5)," a cause of the failure can be found "It should be physical connection issue (N6)" by the knowledge library 516. In some embodiments, if the knowledge library 516 is a knowledge database including one or more conversation graphs for dealing other situations, the first message sequence 512 can be matched in the knowledge database. If a match occurs, a portion associated with the first message sequence 512 can be selected from the knowledge database for continuing the conversation 510 and updating the conversation graph 520. In some embodiments, if the knowledge library 51 is a human expert, the expert can speak to the user 432. Further, nodes N5 and N6 corresponding to the messages N5 and N6, as well as a directed edge L4 corresponding to the message L4 shown in dash can be added into the original portion of the conversation graph to form the updated one. These embodiments provide solutions for determining whether knowledge in the current conversation graph is enough for solving the questions of the user. When the knowledge is not enough, the second message sequence 514 can be used to improve the conversation graph 520.

Figure 6:
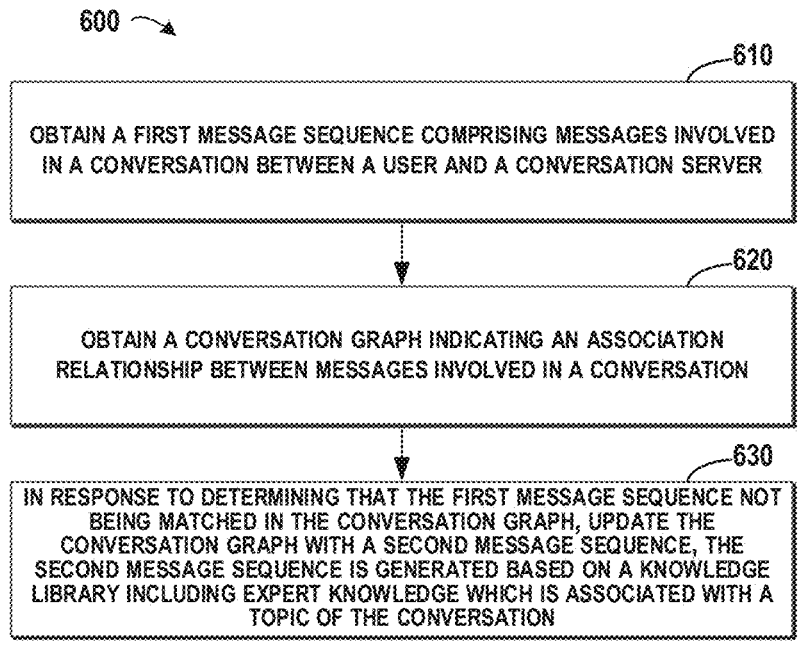
FIG. 6 depicts an example flowchart of a computer-implemented method that facilitates management of a conversation between a service center and a user according to an embodiment of the present invention.

Hereinafter, reference will be made to FIG. 6 for further details. FIG. 6 depicts an example flowchart of a method 500 for managing a conversation between a service center and a user according to an embodiment of the present invention. At block 610, the first message sequence 512, which comprises messages involved in a conversation between the user and the conversation server 430, can be obtained.

According to embodiments of the present invention, as inputs descriptive of the same symptom from various users can be different, the similarity between the messages can be considered. Taking the message L2 from the user 432 as an example, the message is "I cannot navigate any web site." However, this meaning can be expressed in other ways "I cannot connect to the Internet," or "I lost my Internet connection," and the like. At this point, the above various expressions can be considered as have the same meaning and all of them can be mapped to the message L1. In other words, the main idea can be extracted from the message and then be normalized to the template message L1.

Although the above paragraphs show examples where one message corresponds to an input from the user 432 or the conversation server 430. Sometimes, the conversation can relate to various aspects for describing the user's question. Accordingly, one or more messages can be collected and a main idea can be extracted from there to form one message in the first message sequence. In other embodiments, a message in the first message sequence 512 can be determined from a group of messages between the user 432 and the conversation server 430 and reference will be made to FIG. 7 for details.

Figure 7:
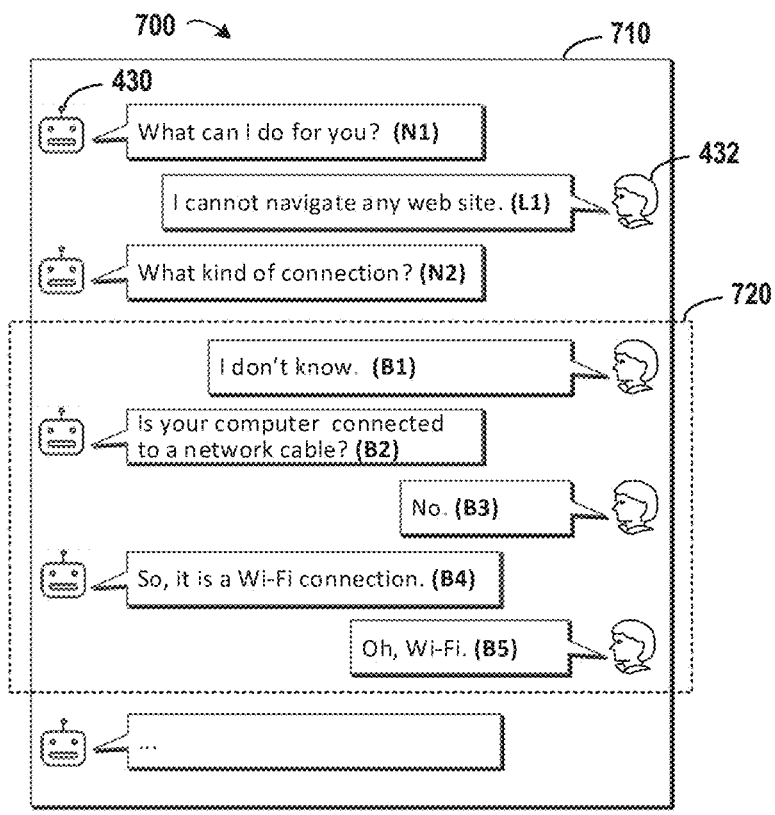
FIG. 7 depicts an example diagram that obtains a message according to an embodiment of the present invention.

FIG. 7 depicts an example diagram 700 for obtaining a message according to an embodiment of the present invention. As shown in FIG. 7, a group 720 of messages involved in a conversation 710 can be obtained. Then, the group 720 of messages can be subjected to a grammatical analysis for example using natural language processing (NLP) technologies so as to determine a message which can represent the main idea of the group 720 of messages. In the group 720, when the conversation server 430 asks "What kind of connection (N2)?" if the user 720 does not know, the user 720 can reply "I don't know (B1)." Then the conversation server 430 can ask "Is your computer connected to a network cable (B2)?" and the user 432 can answer "No (B3)." Next, the conversation server 430 can ask "So, it is a Wi-Fi connection (B4)." and the user 432 can repeat "Oh, Wi-Fi (B5)." Based on the grammatical analysis to the above group 720 of messages B1 to B5, the main idea of the group 720 of messages can be determine and the group 720 can be mapped to the message L2 as shown in FIG. 5.

With the above embodiments, although the exact messages in the first message sequence can be different, the main ideas of the messages can be similar. Here, the similarity level can be used to determine whether the message sequence has similar meanings with message sequences in the conversation graph. Therefore, main ideas in various messages from the users can be considered so as to normalize the various messages into a relatively uniformed one for further processing.

Referring back to block 620 in FIG. 6, a conversation graph indicating an association relationship between messages involved in a conversation can be obtained. For example, the conversation graph can be a predefined one according to various conversations related to various types of failures in computers. According to embodiments of the present invention, the conversation graph can be generated in advance. In order to generate the conversation graph, a plurality of sample message sequences can be obtained from a plurality of sample conversations, respectively. The sample conversations can be typical conversations between users and human computer experts. When a user's computer fails, conversations between the user and a computer expert can be collected. Here, failures of the computer should include various situation, taking the failure of being disconnected from Internet, the failures can relate to various aspects: a failure of a desktop computer, a failure of a notebook, a failure of a Wi-Fi connection, a failure of an Ethernet connection, and so on. The more situations are considered in defining the conversation graph, the more situations can be covered by the conversation graph.

Then, a path indicating an association relationship between messages comprised in the sample message sequence can be generated with respect to one of the sample message sequence. For example, each of the messages in the sample message sequence can be added into the path in a chronological order. In some embodiments, a message received from the user can be represented by one of a node and a directed edge in the conversation graph, and a message received from the conversation server can be represented by another one of a node and a directed edge in the conversation graph. These embodiments provide simple and convenient ways to store the conversation graph. Although the present disclosure provides examples where messages from the server are represented by nodes and messages from the user are represented by directed edges, in other embodiments, the meanings of the nodes and edges can be swapped and details are omitted in the present disclosure.

In one example, a sample message sequence including messages N1, L1, N2, L2, N3, L3 and N4 can be obtained. Then the messages N1, N2, N3 and N4 can be used to generate nodes N1, N2, N3 and N4 in the path, and the messages L1, L2, L3 can be used to generate directed edges L1, L2, L3 between above corresponding nodes. Accordingly, a path comprising N1-L1-N2-L2-N3-L3-N4 can be generated.

Based on a similar manner, other paths can be generated from other sample message sequence, and then those paths can be merged to form the conversation path. The above procedure can be implemented in advance, for example, in a training phase during the development. With these embodiments, in the training phase, sample sequences covering various situations can be collected as much as possible, so as to obtain a conversation graph that can deal with various situations.

The above paragraphs have described how to obtain the first message sequence and the conversation graph. Hereinafter, details will be described for how to update the conversation graph. Referring back to FIG. 6, at block 630, if it is determined that the first message sequence 512 is not matched in the conversation graph 520, the conversation graph 520 can be updated by a second message sequence 514 that is received based on a knowledge library 516 including expert knowledge associated with a topic of the conversation 510. Referring back to FIG. 5, the original portion in the conversation graph 520 can be updated with the portion shown in dash, which is generated based on knowledge from the knowledge library 516.

Reference will be made to FIG. 5 for illustrating how to update the conversation graph 520. According to embodiments of the present invention, a conversation path shown by L4-N5-L5-N6 can be generated based on an association relationship between messages L4, N5, L5 and N6 comprised in the second message sequence 514. Then, the original portion in the conversation graph 520 can be updated by the generated conversation path shown in dash. In these embodiments, all the messages L4, N5, L5 and N6 that are include in the second message sequence 514 can be added into the conversation path one by one. Therefore, a conversation path for dealing the situation of associated with the message L3 "Shinning" can be generated. With these embodiments, the second message sequence 514 can improve scope of the conversation graph 520 to cover more situations in the conversation 510.

According to embodiments of the present invention, similarity levels can be determined between the first message sequence and message sequences indicated in the conversation graph, respectively. In one example, if messages in the first message sequence are mapped to N1, L1, N2, L2, N3, and a message sequence N1, L1, N2, L2, N3 exists in the conversation graph 520, then the first message sequence is exactly matched in the conversation graph 520. In other words, the message sequence exactly matching the first message and having the highest similarity level can be identified from the conversation graph.

Figure 8:
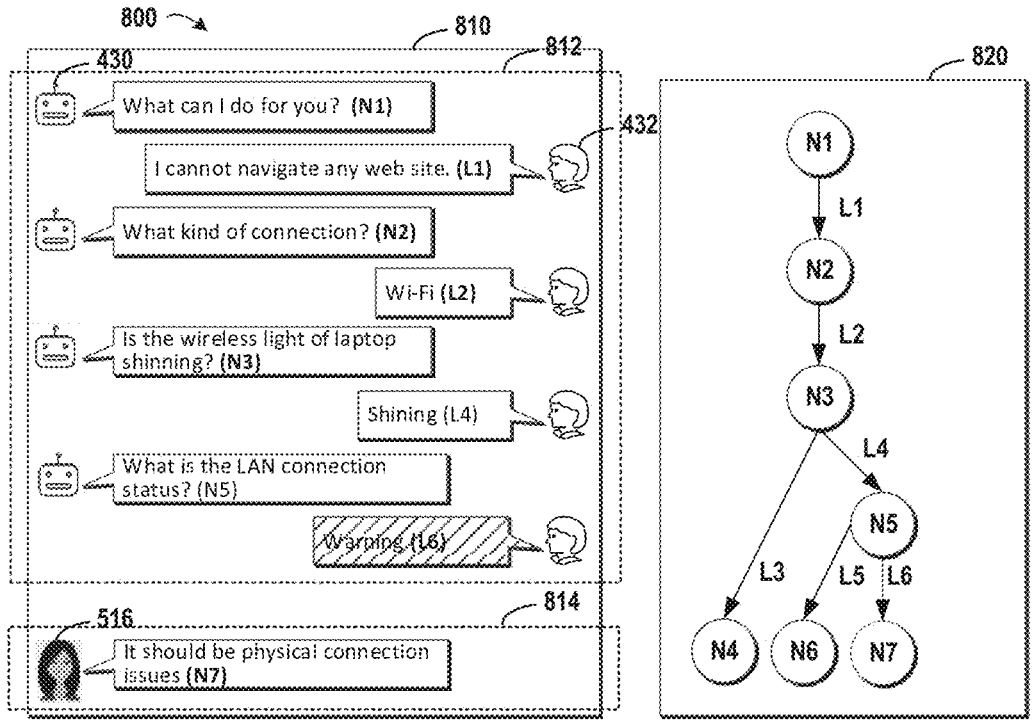
FIG. 8 depicts an example diagram that manages a conversation between a service center and a user according to an embodiment of the present invention.

FIG. 8 depicts an example diagram 800 for managing a conversation between a service center and a user according to an embodiment of the present invention. FIG. 8 shows a conversation 810 that further comprises messages L6 and N7 that are different from the conversation 510 in FIG. 5. As first message sequence 812 including the message L6 is not matched in the original portion shown in solid shapes in the conversation graph 820, the knowledge library 516 can be activated to deal the situation of the waning message L6. Then, the knowledge library 516 can determine that "It should be physical connection issues (N7)." Further, the original portion in the conversation graph 820 can be updated by a conversation path corresponding to the second message sequence 814 (including messages L6 and N7 shown in dash) to form an updated version.

Figure 9:
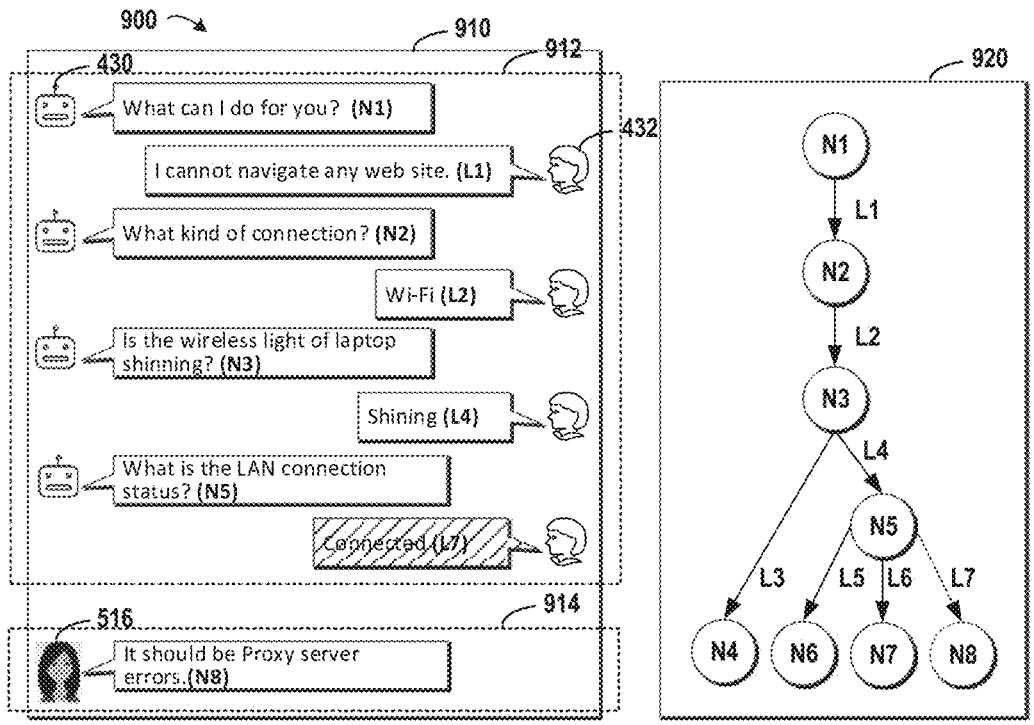
FIG. 9 depicts an example diagram that manages a conversation between a service center and a user according to an embodiment of the present invention.

FIG. 9 depicts an example diagram for managing a conversation between a service center and a user according to an embodiment of the present invention. FIG. 9 shows a conversation 910 which further comprises messages L7 and N8 that are different from the conversation 810 in FIG. 8. As first message sequence 912 including the message L7 is not matched in the original portion shown in solid shapes in the conversation graph 920, the knowledge library 516 can be activated to deal the situation of the message L6. Then, the knowledge library 516 can determine that "It should be proxy server errors (N8)." Further, the original portion in the conversation graph 920 can be updated by a conversation path corresponding to the second message sequence 914 (including messages L7 and N8 shown in dash shapes) to form an updated version.

The above paragraphs have describes situations where a message sequence exactly matching the first message sequence is found in the conversation graphs, sometimes, there may not be an exact match and then a message sequence that is relative similar with the first message sequence can be found from the conversation graph. According to embodiments of the present invention, if the similarity level between the found message sequence and the first message sequence meets a predefined criterion, a feedback can be provided to the user based on a message following the identified message sequence in the conversation graph. These embodiments provide easy and convenient ways to find in the conversation graph a message sequence that is similar with the first message sequence. Further, based on the found message sequence, a feedback can be provided for answering the user's question.

In embodiments of the present invention, a matching amount of messages being matched to the conversation graph and a total amount of the messages in the first message sequence can be considered to determine the similarity level. In one example, a threshold can be defined for determining whether the similarity level is high enough. If the threshold is set to 0.6 and the matching amount and the total amount are 4 and 5 respectively, then 4/5=0.8>0.6. At this point, it can be determined that the first message sequence is matched in the conversation graph. If the threshold is set to 0.9, then the determining result can be "No." In embodiments of the present invention, if all of the determined similarity levels being below the threshold, then it can be determined that the first message sequence is not matched in the conversation graph, and then the knowledge library 516 will take over the conversation.

Figure 10:
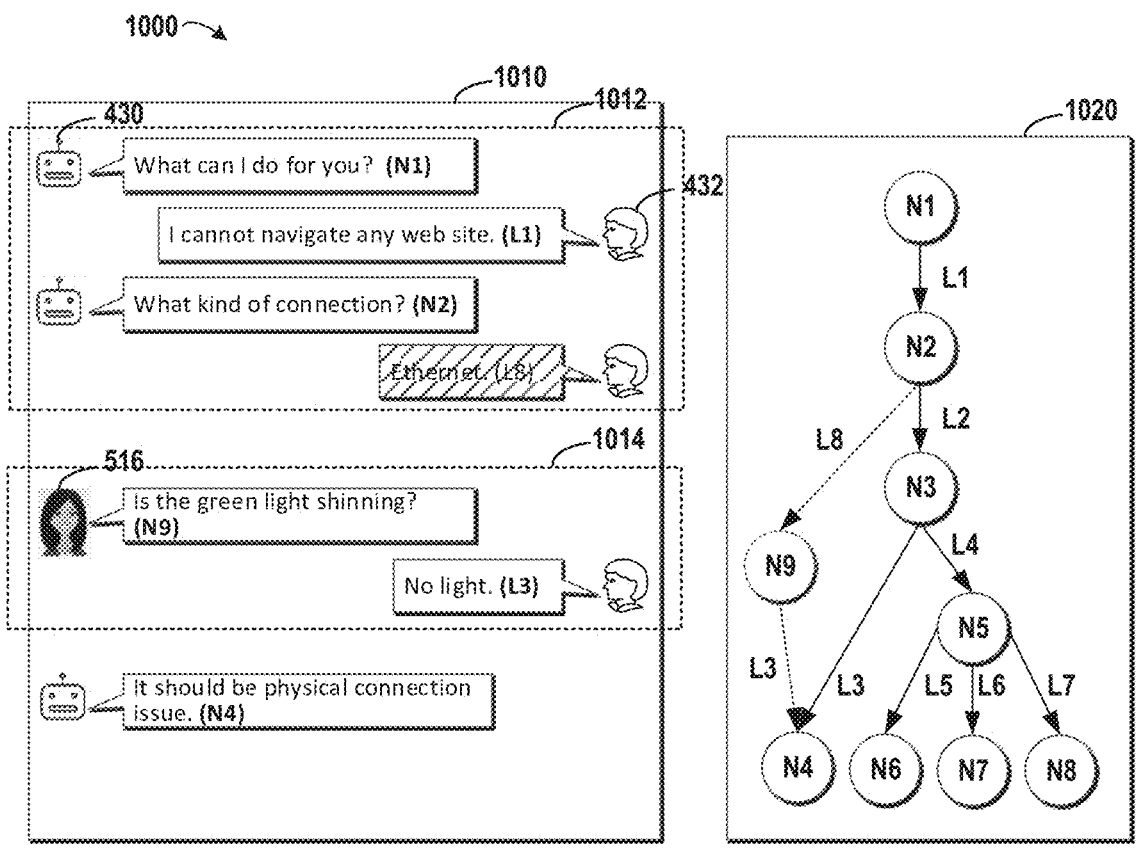
FIG. 10 depicts an example diagram for managing a conversation between a service center and a user according to an embodiment of the present invention.

FIG. 10 depicts an example diagram 1000 for managing a conversation 1010 between a service center and a user according to an embodiment of the present invention. FIG. 10 shows the conversation 1010 where the first message sequence 1012 comprises messages N1, L1, N2, and L8. As the message L8 is not included in the original portion of the conversation 1020, the knowledge library 516 will take over the conversation 1010 and says "Is the green light shining (N9)?" At this point, a dash link L8 and a dash node N9 can be added into the conversation graph 1020. Further, the user 432 can answer "No light (L3)." From the conversation graph 1020, the message sequence N1, L1, N2, L2, N3, L3 is similar to the message sequence N1, L1, N2, L8, N9, L3 in the conversation 1010, where L2 and N3 are replaced by L8 and N9. Therefore it can be estimated that the message indicated by N4 in the conversation graph 1020 can also be used to answer the message L3. Accordingly, a feedback based on the message N4 can be provided to the user 432.

According to embodiments of the present invention, if the provided feedback is an answer accepted by the user, the conversation graph can be updated by the message. In the embodiment of FIG. 10, once the user 432 has fixed the physical connection error in his/her computer, it means that the feedback N4 is an appropriate answer successfully solving the user's question. Therefore, the dash edge L3 can be connected to the node N4, such that the updated conversation graph 1020 can be considered as a correct basis for further use.

According to embodiments of the present invention, the updated conversation graph can be used for processing conversations from other users. With these embodiments, the conversation graph can be improved based on the knowledge library and the updated conversation graph can be used to serve further users that have similar questions.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
   electronically generating, by a device operatively coupled to one or more processors, an electronic first message sequence comprising messages involved in a conversation between a user and a conversation server;
   electronically generating, by the device, an electronic conversation graph indicating an association relationship between messages involved in a conversation between the user and the conversation server, wherein the electronic conversation graph comprises a plurality of nodes and a plurality of directed edges, a message received from the conversation server being represented by a node and a message received from the user being represented as an edge;
   provide, by the device, an automatic reply of ones of the messages associated with the conversation server upon receiving ones of the messages associated with the user;
   in response to determining that the first message sequence is not matched in the conversation graph, updating, by the device, the electronic conversation graph with an electronic second message sequence, the electronic second message sequence being generated based on a knowledge library including expert knowledge that is associated with a topic of the conversation;
   determining, by the device, a main idea of the messages based on performing grammatical analysis of the messages employing natural language processing, wherein a first one of the messages differs in content from a second one of the messages, and wherein the determining the main idea comprises analyzing the first one of the messages and analyzing the second one of the messages, and determining the main idea based on the analyzing the first one of the messages and analyzing the second one of the messages; and provide, by the device, an automatic reply of one of the messages associated with the conversation server based on the determination of the main idea of the messages.

2. The computer-implemented method of claim 1, further comprising:

electronically generating, by the device, the electronic second message sequence comprising messages involved in a conversation between the user and the knowledge library, a first message in the electronic second message sequence being an answer to a last message in the first message sequence.

3. The computer-implemented method of claim 1, wherein the updating the conversation graph comprises:

electronically generating, by the device, a conversation path indicating an association relationship between messages comprised in the electronic second message sequence; and updating, by one or more processors, the electronic conversation graph with the generated conversation path.

4. The computer-implemented method of claim 1, wherein the electronically generating the electronic conversation graph comprises:

electronically generating, by the device, a plurality of electronic sample message sequences from a plurality of electronic sample conversations, respectively, with respect to one of the plurality of electronic sample message sequences;

electronically generating, by the device, a path indicating an association relationship between messages comprised in the electronic sample message sequence; and obtaining, by the device, the conversation graph based on the generated path.

5. The computer-implemented method of claim 1, further comprising:

determining, by the device, similarity levels between the electronic first message sequence and message sequences in the conversation graph, respectively; and determining, by the device, that the electronic first message sequence not being matched in the electronic conversation graph in response to all of the determined similarity levels being below a threshold.

6. The computer-implemented method of claim 5, further comprising:

identifying, by the device, an electronic message sequence from the electronic conversation graph, a similarity level between the electronic identified message sequence and the electronic first message sequence being higher than a similarity level between another electronic message sequence in the electronic conversation graph and the first electronic message sequence; and providing, by the device, a feedback to the user based on a message following the electronic identified message sequence in the electronic conversation graph.

7. The computer-implemented method of claim 6, further comprising:

updating, by the device, the electronic conversation graph with the message following the electronic identified message sequence in response to the provided feedback being an answer accepted by the user.

8. The computer-implemented method of claim 1, wherein the obtaining the electronic first message sequence comprises:

with respect to a given message in the electronic first message sequence, electronically generating, by the device, a group of electronic messages involved in the conversation; and determining, by the device, the given message based on a grammatical analysis to the group of messages.

9. The computer-implemented method of claim 1, wherein the electronic conversation graph comprises a plurality of nodes and a plurality of directed edges, a message received from the user being represented by one of a node and a directed edge in the electronic conversation graph, and a message received from the conversation server being represented by another one of a node and a directed edge in the conversation graph.

10. A system comprising:

a memory that stores computer executable components; and a processor, operably coupled to the memory, and that executes the computer executable components stored in the memory, wherein the computer executable components comprise:

at least one computer-executable component that:

electronically generates an electronic first message sequence comprising messages involved in a conversation between a user and a conversation server;

electronically generates an electronic conversation graph indicating an association relationship between messages involved in a conversation, wherein the electronic conversation graph comprises a plurality of nodes and a plurality of directed edges, a message received from the conversation server being represented by a node and a message received from the user being represented as an edge;

provides an automatic reply of ones of the messages associated with the conversation server upon receiving ones of the messages associated with the user;

in response to a determination that the electronic first message sequence is not matched in the electronic conversation graph, updates the electronic conversation graph with an electronic second message sequence, the electronic second message sequence being generated based on a knowledge library including expert knowledge that is associated with a topic of the conversation; and determines a main idea of the messages based on performing grammatical analysis of the messages employing natural language processing, wherein the main idea of the messages is a meaning of the messages; and provides an automatic reply of one of the messages associated with the conversation server based on the determination of the main idea of the messages.

11. The computer-implemented system of claim 10, wherein the at least one computer-executable component further:

obtains the electronic second message sequence comprising messages involved in a conversation between the user and the knowledge library, an electronic first message in the electronic second message sequence being an answer to an electronic last message in the electronic first massage sequence.

12. The computer-implemented system of claim 10, wherein an updating of the electronic conversation graph comprises:

generation of a conversation path indicating an association relationship between messages comprised in the electronic second message sequence; and an updating of the electronic conversation graph with the generated conversation path.

13. The computer-implemented system of claim 10, wherein the electronic generation of the electronic conversation graph comprises:
electronic generation of a plurality of electronic sample message sequences from a plurality of sample conversations, respectively;
with respect to one of the plurality of electronic sample message sequences, generation of a path indicating an association relationship between messages comprised in the electronic sample message sequence; and
generation of the conversation graph based on the generated path.

14. The computer-implemented system of claim 10, wherein the at least one computer-executable component further:
determines similarity levels between the first message sequence and message sequences in the conversation graph, respectively; and
determines that the first message sequence not being matched in the conversation graph in response to all of the determined similarity levels being below a threshold.

15. The computer-implemented system of claim 14, wherein the at least one computer-executable component further:
identifies an electronic message sequence from the electronic conversation graph, a similarity level between the electronic identified message sequence and the electronic first message sequence being higher than a similarity level between another electronic message sequence in the conversation graph and the electronic first message sequence; and
provides a feedback to the user based on a message following the electronic identified message sequence in the electronic conversation graph.

16. The computer-implemented system of claim 15, wherein the at least one computer-executable component further:
updates the electronic conversation graph with the message following the electronic identified message sequence in response to the provided feedback being an answer accepted by the user.

17. The computer-implemented system of claim 10, wherein the electronic generation of the first message sequence comprises:
with respect to a given message in the electronic first message sequence,
an electronic generation of a group of messages involved in the conversation; and
determination of the given message based on a grammatical analysis to the group of messages.

18. The computer-implemented system of claim 10, wherein the electronic conversation graph comprises a plurality of nodes and a plurality of directed edges, a message received from the user being represented by one of a node and a directed edge in the conversation graph, and a message received from the conversation server being represented by another one of a node and a directed edge in the conversation graph.

19. A computer program product facilitating a conversational system based on machine learning, the computer program product comprising a computer readable storage medium having program instructions embodied therewith, the program instructions executable by a processor to cause the processor to:
generate an electronic first message sequence comprising messages involved in a conversation between a user and a conversation server;
generate an electronic conversation graph indicating an association relationship between messages involved in a conversation, wherein the electronic conversation graph comprises a plurality of nodes and a plurality of directed edges, a message received from the conversation server being represented by a node and a message received from the user being represented as an edge;
provide an automatic reply of ones of the messages associated with the conversation server upon receiving ones of the messages associated with the user;
in response to determining that the electronic first message sequence not being matched in the electronic conversation graph, updates the electronic conversation graph with an electronic second message sequence, the electronic second message sequence being generated based on a knowledge library including expert knowledge that is associated with a topic of the conversation; and
determine a main idea of the messages based on performing grammatical analysis of the messages employing natural language processing, wherein the determination of the main idea comprises:
analysis of main ideas of multiple ones of the messages, wherein content of a first one of the messages differs from content of a second one of the messages; and
determination of the main idea of the messages based on the analysis; and
normalization of the messages into a uniform message based on the determination of the main idea; and
provide an automatic reply of one of the messages associated with the conversation server based on the uniform message.

20. The computer program product of claim 19, wherein the obtaining the electronic conversation graph comprises:
obtaining a plurality of sample message sequences from a plurality of sample conversations, respectively;
with respect to one of the plurality of sample message sequences, generation of a path indicating an association relationship between messages comprised in the sample message sequence; and
obtaining, by one or more processors, the conversation graph based on the generated path.

* * * * *